(12) United States Patent
Qiu et al.

(10) Patent No.: US 11,156,889 B1
(45) Date of Patent: Oct. 26, 2021

(54) LIQUID CRYSTAL DISPLAY PANEL AND MANUFACTURING METHOD THEREOF

(71) Applicant: TCL China Star Optoelectronics Technology Co., Ltd., Shenzhen (CN)

(72) Inventors: Mengyu Qiu, Shenzhen (CN); Peng Du, Shenzhen (CN)

(73) Assignee: TCL China Star Optoelectronics Technology Co., Ltd., Guangdong (CN)

( * ) Notice: Subject to any disclaimer, the term of this patent is extended or adjusted under 35 U.S.C. 154(b) by 233 days.

(21) Appl. No.: 16/617,810

(22) PCT Filed: Sep. 17, 2019

(86) PCT No.: PCT/CN2019/106211
§ 371 (c)(1),
(2) Date: Nov. 27, 2019

(87) PCT Pub. No.: WO2021/027707
PCT Pub. Date: Feb. 18, 2021

(30) Foreign Application Priority Data

Aug. 14, 2019 (CN) .......................... 201910747098.X (51) Int. Cl.
*G02F 1/1362* (2006.01)
*G02F 1/1368* (2006.01)
(52) U.S. Cl.
CPC ...... *G02F 1/136295* (2021.01); *G02F 1/1368* (2013.01)

(58) Field of Classification Search
CPC .................... G02F 1/136295; G02F 1/1368
USPC .................................................. 349/149–157
See application file for complete search history.

(56) References Cited

U.S. PATENT DOCUMENTS

2018/0173042 A1* 6/2018 Kim ...................... G02F 1/1368
2020/0013840 A1   1/2020 Ko et al.

FOREIGN PATENT DOCUMENTS

| CN | 102314027 A | 1/2012 |
| CN | 105158986 A | 12/2015 |
| CN | 107315272 A | 11/2017 |
| CN | 108666286 A | 10/2018 |
| CN | 108873423 A | 11/2018 |
| CN | 109521610 A | 3/2019 |

* cited by examiner

*Primary Examiner* — Charles S Chang
(74) *Attorney, Agent, or Firm* — Taft Stettinius & Hollister LLP (57) ABSTRACT

The present disclosure provides a liquid crystal display panel and a manufacturing method thereof by disposing a side bond pad on sides of a first substrate and a second substrate, and a side of a sealing bezel adhesive layer away from a liquid crystal layer. Wherein, the side bond pad is in contact with a first transparent conductive layer of the first substrate, and a chip on film is bonded to the side bond pad in a side bonding way. It can achieve that a common voltage signal is transmitted from a side of the first substrate to the first substrate, processes relating to gold ball are reduced, and an external space of a panel is effectively narrowed.

20 Claims, 4 Drawing Sheets

LIQUID CRYSTAL DISPLAY PANEL AND MANUFACTURING METHOD THEREOF

CROSS REFERENCE TO RELATED APPLICATIONS

This application claims priority to, and the benefit of, International Application No. PCT/CN2019/106211, filed on Sep. 17, 2019, which claims priority to, and the benefit of, Chinese Application No. 201910747098.X, filed on Aug. 14, 2019. The entire disclosures of each of the above applications are incorporated herein by reference.

FIELD OF INVENTION

The present disclosure relates to the field of liquid crystal display technologies, and more particularly to a liquid crystal display panel and a manufacturing method thereof.

BACKGROUND OF INVENTION

In TV and commercial display panel markets, narrow frame products have become more popular, and narrowing frame widths of display panels is a very important design issue.

Thin film transistor-liquid crystal displays (TFT-LCDs) are generally composed of a first substrate, a second substrate, and a liquid crystal (LC) layer disposed between the two substrates. The first substrate and the second substrate are respectively fabricated, the first substrate may be a color film (CF) substrate, the second substrate may be a thin film transistor (TFT) array substrate, and the first and second substrate are paired to form a liquid crystal box. Vertical alignment (VA) mode and twisted nematic (TN) mode are two important liquid crystal display modes. A liquid crystal capacitor in a liquid crystal display panel of VA mode and TN mode is formed by a pixel electrode and a CF substrate-side common electrode (CF-COM), and controls liquid crystal molecules to deflect according to a voltage applied on both sides of the liquid crystal capacitor.

In current liquid crystal display panels of VA mode and TN mode, a CF substrate-side common voltage (COM) signal is provided by a driver IC bonded to a TFT array substrate side, then enters to circuits on the TFT array substrate, and is transmitted to the CF substrate side by a transfer pad and gold ball (Au balls). In conventional panels, center positions of transfer pads and gold ball are usually staggered by a distance when manufacturing, so that the two occupy a greater external space, which is very unfavorable for narrowing frames of panels.

Figure 1:
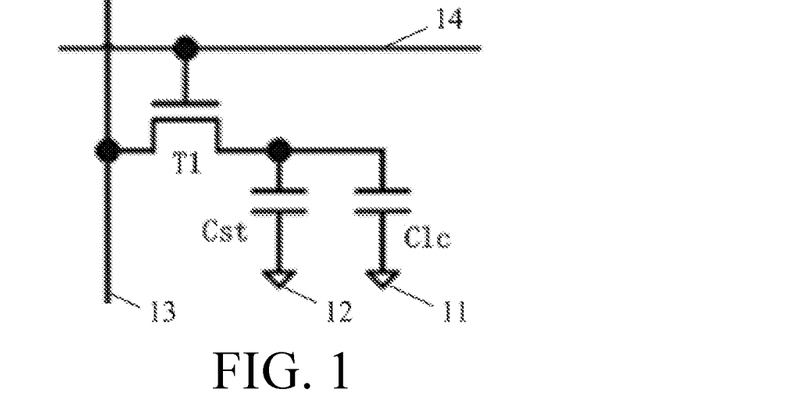
FIG. 1 is an equivalent circuit diagram of a pixel in a display panel in VA mode or TN mode.
Figure 2:
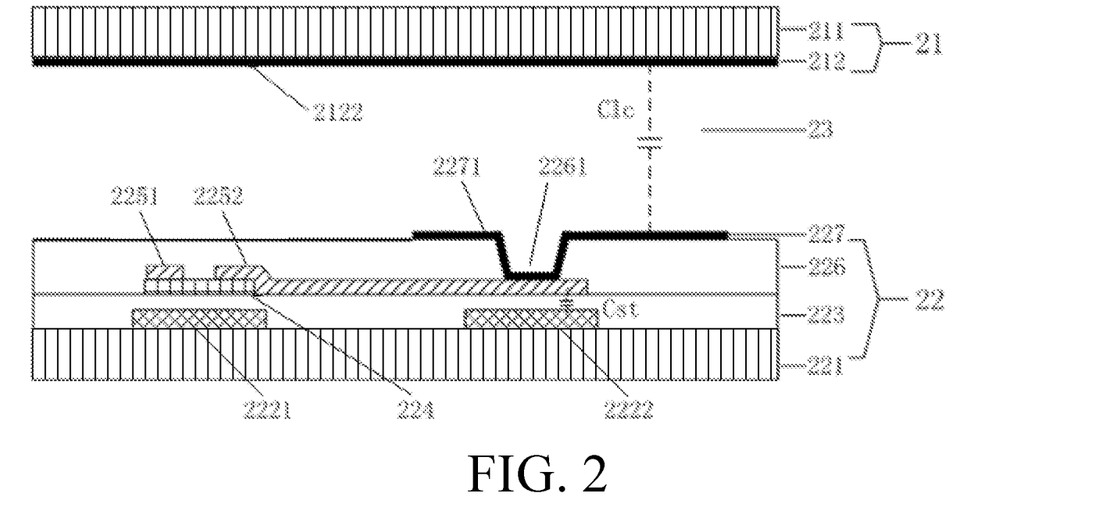
FIG. 2 is a schematic cross-sectional diagram of a film layer structure in current liquid crystal display panels.
Figure 3:
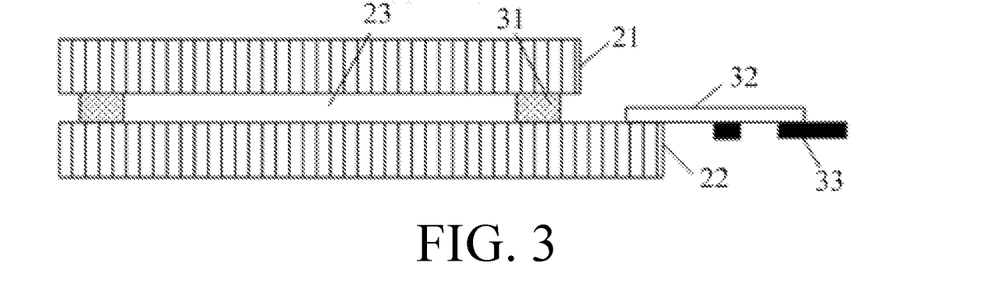
FIG. 3 is a schematic bonding diagram of current liquid crystal display panels.
Figure 4:
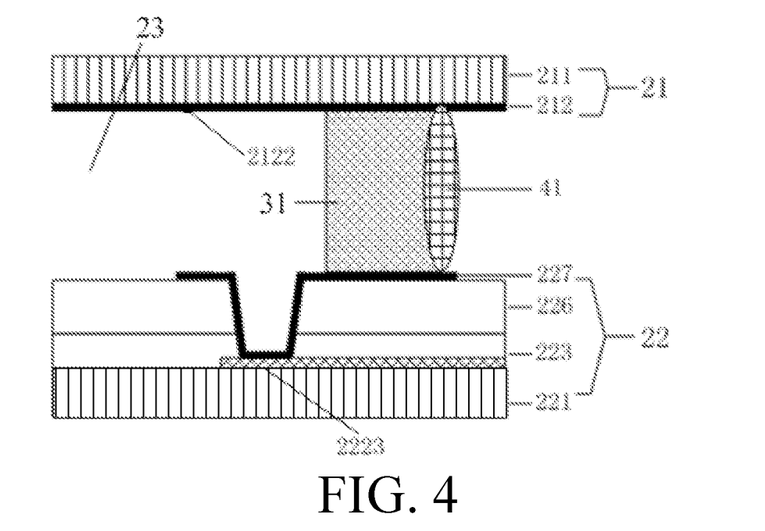
FIG. 4 is a schematic structural diagram of two conducted substrates in current liquid crystal display panels.
Figure 5:
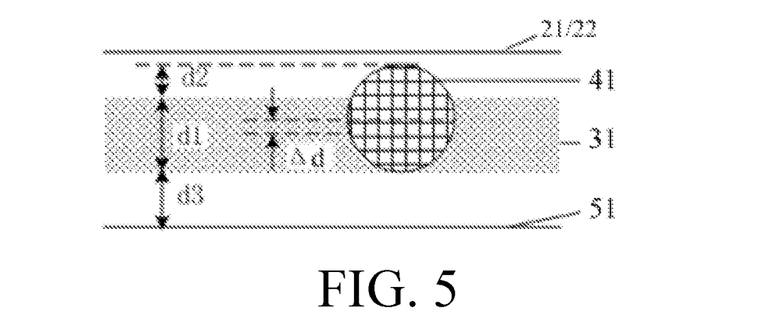
FIG. 5 is a schematic planar diagram of an external setting of the liquid crystal display panel in FIG. 4.

Referring to FIG. 1 to FIG. 5, FIG. 1 is an equivalent circuit diagram of a display panel in VA mode or TN mode, FIG. 2 is a schematic cross-sectional diagram of a film layer structure in current liquid crystal display panels, FIG. 3 is a schematic bonding diagram of current liquid crystal display panels, FIG. 4 is a schematic structural diagram of two conducted substrates in current liquid crystal display panels, and FIG. 5 is a schematic planar diagram of an external setting of the liquid crystal display panel in FIG. 4.

As shown in FIG. 1, a storage capacitor Cst and a liquid crystal capacitor Clc are the two most important capacitors of a pixel. Wherein, two electrodes of the liquid crystal capacitor Clc are respective a pixel electrode (which is connected to a source electrode of a thin film transistor T1 in a pixel) and a CF substrate-side common electrode (CF-COM) 11, and two electrodes of the storage capacitor Cst are respective the pixel electrode and a TFT array substrate-side common electrode (Array-COM, hereinafter referred to as A-COM) 12. A drain electrode of the thin film transistor T1 is connected to a data signal line (Data) 13 and a gate electrode thereof is connected to a scan signal line (Scan) 14. The storage capacitor Cst is generally used to maintain stability of potentials of the pixel electrode, and the liquid crystal capacitor Clc is used to control rotations of liquid crystal molecules according to a voltage applied at both ends thereof.

As shown in FIG. 2, a film layer structure in current liquid crystal display panels comprises: a CF substrate 21, a TFT array substrate 22, and a liquid crystal layer 23 disposed between the two substrates. The CF substrate 21 comprises a CF-side base substrate 211 and a first transparent conductive layer 212 disposed on the CF-side base substrate 211. The TFT array substrate 22 comprises a TFT-side base substrate 221, a first metal layer, a gate insulating layer (GI) 223, an active layer 224, a second metal layer, a passivation layer (PAV/PFA) 226, and a second transparent conductive layer (ITO) 227 disposed in sequence on the TFT-side base substrate 221. Pattern the first metal layer to form a gate electrode 2221 of at least one thin film transistor, a A-COM 2222, and a CF substrate-side common voltage signal line 2223 (as shown in FIG. 4), and pattern the second metal layer to form a drain electrode 2251 and a source electrode 2252 of the thin film transistor. The first transparent conductive layer 212 includes a CF-COM 2122. The second transparent conductive layer 227 includes a pixel electrode 2271. The pixel electrode 2271 and the source electrode 2252 are connected by a through-hole 2261 disposed on the passivation layer 226. The storage capacitor Cst is formed between the A-COM 2222 and the pixel electrode 2271, and the liquid crystal capacitor Clc (shown by a broken line in the figure) is formed between the pixel electrode 2271 and the CF-COM 2122.

As shown in FIG. 3, the two substrates of a liquid crystal display panel are paired to form a liquid crystal box. A closed ring pattern of sealing bezel adhesive layer 31 is formed on surrounding of the liquid crystal display panel by a sealing material (sealant), and the liquid crystal layer 23 is sealed therein. Use a chip on film (COF) 32 bonding a printed circuit board assembly (PCBA) 33 provided with a driver IC to the TFT array substrate 22 of the liquid crystal display panel. Because the driver IC is directly bonded to the TFT array substrate 22, its output signal is also the first to enter circuits of the TFT array substrate 22.

As shown in FIG. 4, the CF substrate-side common voltage signal line 2223 on the TFT array substrate 22 is connected to a driver IC (not shown in the figure). Gold ball (Au balls) 41 are on an outside of the sealing bezel adhesive layer 31, where the second transparent conductive layer 227 connected to the CF substrate-side common voltage signal line 2223 is exposed. A CF substrate-side common voltage signal provided by the driver IC firstly enters the CF substrate-side common voltage signal line 2223 on the TFT array substrate 22, and then the CF substrate-side common voltage signal is conducted to the CF-COM 2122 of the CF substrate 21 through the second transparent conductive layer 227 and the gold ball 41.

As shown in FIG. 5, assuming that a width of the sealing bezel adhesive layer 31 is d1, for processing requirements, the center of the sealing bezel adhesive layer 31 and the center of the gold ball 41 are usually staggered by a distance Δd, so that the gold ball 41 may exceed the sealing bezel adhesive layer 31 by a distance d2. In designs of periphery of an entire panel, the total width occupied by the sealing bezel adhesive layer 31 and the gold ball 41 are d1+d2, it is greater than 1 mm in conventional, the width is greater for video wall products, and this will make panel frames difficult to continue to narrow down, which is unfavorable to achieve narrow frame panels. Besides, in panel designs, there's a great number of patterned transparent conductive layer (ITO patterns) on external part of a display area (AA area) 51 used to connect lines among different layers. The ITO patterns are conventionally connected to different signal lines. These ITO patterns cannot enter the sealing bezel adhesive layer 31 area, or the gold ball 41 in the sealing bezel adhesive layer 31 will conduct these ITO patterns and the CF-COM 2122, causing a short circuit of an input signal of the panel and the CF-COM, thereby causing abnormal display. Therefore, the sealing bezel adhesive layer 31 needs to maintain a safe distance d3 from the AA area of the panel. Existence of this distance will also make it difficult to continue to narrow the display panel frames of VA mode and TN mode.

SUMMARY OF INVENTION

An object of the present disclosure provides a liquid crystal display panel and a manufacturing method thereof to solve the problems in current technology and to optimize structures of an external area of panels, thereby achieving narrower frames.

To achieve the above object, the present disclosure provides a liquid crystal display panel. The liquid crystal display panel comprises a first substrate, a second substrate disposed opposite to the first substrate, and a liquid crystal layer disposed between the first substrate and the second substrate, wherein a non-display area of the liquid crystal display panel is provided with a sealing bezel adhesive layer to seal the liquid crystal layer. The first substrate comprises a first transparent conductive layer including a first common electrode. The second substrate comprises: a second base substrate, a first metal layer, a gate insulating layer, a passivation layer, and a second transparent conductive layer disposed on the second base substrate; wherein the first metal layer includes a first common voltage signal line, the second transparent conductive layer and the first common voltage signal line are connected by a through-hole; wherein in the non-display area, a second conductive material is disposed between the first substrate and the second substrate, and the second conductive material is in contact with the first transparent conductive layer and the second transparent conductive layer. The liquid crystal display panel comprises a side bond pad disposed on sides of the first substrate and the second substrate and a side of the sealing bezel adhesive layer away from the liquid crystal layer; wherein the side bond pad is in contact with the first transparent conductive layer, and is made by printing a first conductive material on the sides of the first substrate and the second substrate and the side of the sealing bezel adhesive layer away from the liquid crystal layer; and a side surface of the liquid crystal display panel provided with the side bond pad is bonded with a chip on film, wherein the first transparent conductive layer is electrically connected to a second common voltage signal line on the chip on film through the side bond pad that makes the first common electrode receive a common voltage signal transmitted from the chip on film, and is electrically connected to the second common voltage signal line through the second conductive material, the second transparent conductive layer, and the first common voltage signal line that makes the first common electrode receive the common voltage signal.

To achieve the above object, the present disclosure further provides a liquid crystal display panel. The liquid crystal display panel comprises a first substrate, a second substrate disposed opposite to the first substrate, and a liquid crystal layer disposed between the first substrate and the second substrate, wherein a non-display area of the liquid crystal display panel is provided with a sealing bezel adhesive layer to seal the liquid crystal layer. The first substrate comprises a first transparent conductive layer including a first common electrode. The liquid crystal display panel comprises a side bond pad disposed on sides of the first substrate and the second substrate and a side of the sealing bezel adhesive layer away from the liquid crystal layer; wherein the side bond pad is in contact with the first transparent conductive layer; and a side surface of the liquid crystal display panel provided with the side bond pad is bonded with a chip on film, wherein the first transparent conductive layer is electrically connected to a second common voltage signal line on the chip on film through the side bond pad that makes the first common electrode receive a common voltage signal transmitted from the chip on film.

To achieve the above object, the present disclosure further provides a manufacturing method of a liquid crystal display panel. The method comprises following steps: (1) printing a first conductive material on sides of a first substrate and a second substrate and one side of a sealing bezel adhesive layer away from a liquid crystal layer, and preparing a side bond pad in contact with a first transparent conductive layer of the first substrate, wherein the first transparent conductive layer includes a first common electrode; and (2) attaching a chip on film to a side surface of the liquid crystal display panel provided with the side bond pad, and electrically connecting the first transparent conductive layer to a second common voltage signal line on the chip on film through the side bond pad that makes the first common electrode receive a common voltage signal transmitted from the chip on film.

Advantages of the present disclosure is: The present disclosure can achieve that a CF substrate-side common voltage signal is transmitted to the CF substrate, processes relating to gold ball are reduced, an external space of a panel is effectively narrowed, product yield of liquid crystal display panels is effectively improved, production efficiency is improved, and product competitiveness is improved by improving an external structure of display panels.

DESCRIPTION OF DRAWINGS

The accompanying figures to be used in the description of embodiments of the present disclosure will be described in brief to more clearly illustrate the technical solutions of the embodiments. The accompanying figures described below are only part of the embodiments of the present disclosure, from which those skilled in the art can derive further figures without making any inventive efforts.

DETAILED DESCRIPTION OF PREFERRED EMBODIMENTS

The embodiments of the present disclosure are described in detail hereinafter. Examples of the described embodiments are given in the accompanying drawings, wherein the identical or similar reference numerals constantly denote the identical or similar elements or elements having the identical or similar functions. The specific embodiments described with reference to the attached drawings are all exemplary and are intended to illustrate and interpret the present disclosure, which shall not be construed as causing limitations to the present disclosure.

The terms "first", "second", "third", etc. (if present) in the specification, claims of the present disclosure, and the drawings are used to distinguish similar objects, and are not necessarily used to describe in a particular order or prioritization, it should be understood that the objects so described may be interchanged where appropriate.

In the description of the present disclosure, unless specified or limited otherwise, it should be noted that, a structure in which a first feature is "on" or "beneath" a second feature may include an embodiment in which the first feature directly contacts the second feature and may also include an embodiment in which an additional feature is formed between the first feature and the second feature so that the first feature does not directly contact the second feature. Furthermore, a first feature "on," "above," or "on top of" a second feature may include an embodiment in which the first feature is right "on," "above," or "on top of" the second feature and may also include an embodiment in which the first feature is not right "on," "above," or "on top of" the second feature, or just means that the first feature has a sea level elevation greater than the sea level elevation of the second feature. While first feature "beneath," "below," or "on bottom of" a second feature may include an embodiment in which the first feature is right "beneath," "below," or "on bottom of" the second feature and may also include an embodiment in which the first feature is not right "beneath," "below," or "on bottom of" the second feature, or just means that the first feature has a sea level elevation less than the sea level elevation of the second feature.

The following description provides many different embodiments or examples for implementing different structures of the present disclosure. In order to simplify the present disclosure, the components and settings of a specific example are described below. Of course, they are merely examples and are not intended to limit the present disclosure. In addition, the present disclosure may repeat reference numerals and/or reference letters in different examples, which are for the purpose of simplicity and clarity, and do not indicate the relationship between the various embodiments and/or arrangements discussed. In addition, the present disclosure provides examples of various specific processes and materials, but one of ordinary skill in the art will recognize the use of other processes and/or the use of other materials.

The liquid crystal display panel provided by the present disclosure comprises a first substrate, a second substrate disposed opposite to the first substrate, and a liquid crystal layer disposed between the first substrate and the second substrate, wherein a non-display area of the liquid crystal display panel is provided with a sealing bezel adhesive layer to seal the liquid crystal layer. The first substrate comprises a first transparent conductive layer including a first common electrode. The liquid crystal display panel comprises a side bond pad (bonding pad) disposed on sides of the first substrate and the second substrate and a side of the sealing bezel adhesive layer away from the liquid crystal layer; wherein the side bond pad is in contact with the first transparent conductive layer; and a side surface of the liquid crystal display panel provided with the side bond pad is bonded with a chip on film (COF), wherein the first transparent conductive layer is electrically connected to a third common voltage signal line on the chip on film through the side bond pad that makes the first common electrode receive a common voltage signal transmitted from the chip on film. That is, the present disclosure combines a side bonding structure and improves the sealing bezel adhesive layer (sealant) and the transfer pad by disposing a side bond pad, making the first transparent conductive layer electrically connected to the second common voltage signal line on the chip on film through the side bond pad, so that the first common electrode can directly receive the common voltage signal transmitted from the chip on film. It realizes transmission of common voltage signals to the first substrate, and saves a space for outer lead bonding (OLB) area, thereby effectively narrowing frames of liquid crystal display panels. It is very favorable for narrowing frames of VA mode and TN mode display panels.

Figure 6:
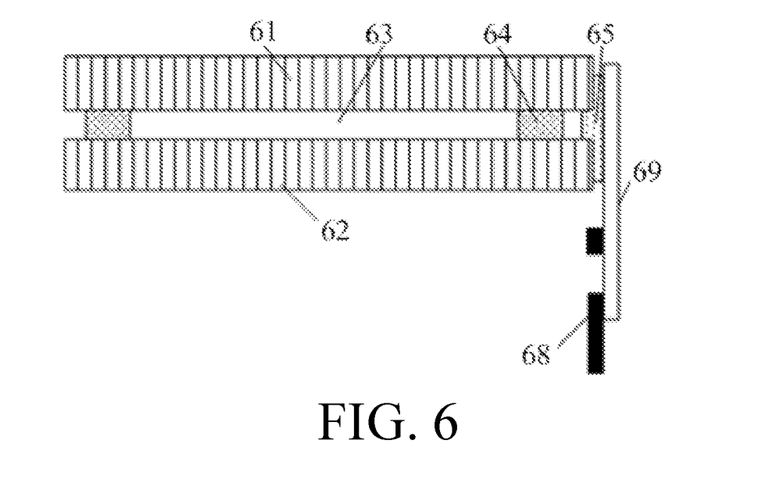
FIG. 6 is a schematic bonding diagram of a liquid crystal display panel according to an embodiment of the present disclosure.
Figure 7:
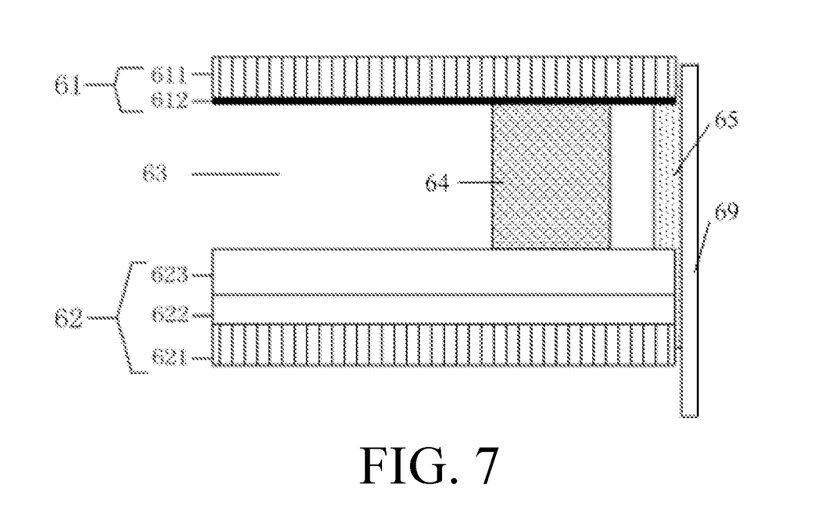
FIG. 7 is a schematic structural diagram of two conducted substrates in a liquid crystal display panel according embodiment 1 of the present disclosure.
Figure 8:
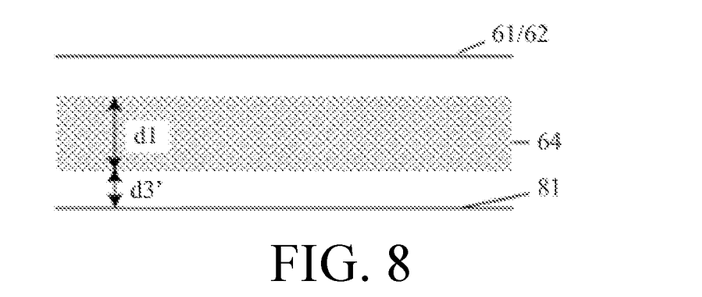
FIG. 8 is a schematic planar diagram of an external setting of the liquid crystal display panel in FIG. 7.

Referring to FIG. 6 to FIG. 8, FIG. 6 is a schematic bonding diagram of a liquid crystal display panel according to an embodiment of the present disclosure. FIG. 7 is a schematic structural diagram of two conducted substrates in a liquid crystal display panel according embodiment 1 of the present disclosure. FIG. 8 is a schematic planar diagram of an external setting of the liquid crystal display panel in FIG. 7.

As shown in FIG. 6, the liquid crystal display panel comprises a first substrate 61, a second substrate 62, and a liquid crystal layer 63 disposed between the two substrates. The two substrates are paired to form a liquid crystal box. A closed ring pattern of a sealing bezel adhesive layer 64 is formed on surrounding (non-display area) of the liquid crystal display panel by a sealing material (sealant), and the liquid crystal layer 63 is sealed therein. A side bond pad 65 is disposed on one side surface of the liquid crystal display panel which is used to bond a chip on film 69. Using the chip on film 69 to bond a PCBA 68 provided with a driver IC respectively to the two substrates. Since the driver IC is respectively and directly bonded to the two substrates, output signals also respectively and directly enter wirings on the two substrates. That is, the liquid crystal display panel uses a side bonding structure of bonding a COF on one side surface of the panel. The way of side bonding saves a space for OLB area, thereby effectively narrowing frames of liquid crystal display panels.

As shown in FIG. 7, the first substrate 61 comprises: a first base substrate 611, and a first transparent conductive layer (ITO) 612 disposed on the first base substrate 611. The first transparent conductive layer 612 comprises a first common electrode. The second substrate 62 comprises: a second base substrate 621, a gate insulating layer 622 and a passivation layer 623 disposed on the second base substrate 621. The liquid crystal display panel comprises the side bond pad 65 disposed on sides of the first substrate 61 and the second substrate 62 and a side of the sealing bezel adhesive layer 64 away from the liquid crystal layer 63; wherein the side bond pad 65 is in contact with the first transparent conductive layer 612; and a side surface of the liquid crystal display panel provided with the side bond pad 65 is bonded with a chip on film 69, wherein the first transparent conductive layer 612 is electrically connected to a second common voltage signal line (not shown in the figure) on the chip on film 69 through the side bond pad 65 that makes the first common electrode receive a common voltage signal transmitted from the chip on film 69.

In the embodiment, the first substrate 61 is a color film (CF) substrate, the second substrate 62 is a thin film transistor (TFT) array substrate, and the first common electrode is a color film substrate-side common electrode (CF-COM). The first base substrate 611 may be a glass substrate. It should be noted that, other components for displaying the desired color filter substrate, such as a black matrix (BM), a color resist layer (R/G/B), and a photoresist layer (PS), are also formed on the first base substrate 611. The setting method and manufacturing method can refer to current processes, and will not be iterated herein. The second base substrate 621 may be a glass substrate, and the passivation layer 623 may be prepared by PAV/PFA. It should be noted that the second base substrate 621 is prepared with other components of the desired array substrate, such as a first metal layer, an active layer, a second metal layer, and a second transparent conductive layer. Pattern the first metal layer to form a gate electrode of at least one thin film transistor, and a second common electrode (that is a TFT array substrate-side common electrode, A-COM). The active layer comprises a channel area and a source/drain electrode contact area. The source/drain electrode contact area is disposed at both ends of the channel area. Pattern the second metal layer to form a drain electrode and a source electrode of the thin film transistor. The second transparent conductive layer includes a pixel electrode, and the pixel electrode and the source electrode are connected by a through-hole. A storage capacitor Cst is formed between the A-COM and the pixel electrode, and a liquid crystal capacitor Clc is formed between the pixel electrode and the CF-COM. For the setting manner and manufacturing method of each component on the above array substrate, reference may be made to the current processes, and details are not described herein again. In other embodiments, the first substrate 61 may also be an array substrate. Correspondingly, the second substrate 62 may be a color filter substrate.

Preferably, the side bond pad 65 is made by printing a first conductive material on the sides of the first substrate 61 and the second substrate 62 and the side of the sealing bezel adhesive layer 64 away from the liquid crystal layer 63. Preferably, the first conductive material is silver (Ag). The side bond pad is printed with an Ag material in advance on edges of the two substrates of the display panel to increase a contact area of lines on the COF. After completing COF bonding, the common voltage signal line on the COF and the CF substrate-side transparent conductive layer (ITO) are electrically connected. The CF substrate-side transparent conductive layer (CF-ITO), the side bond pad 65, and the common voltage signal line on the COF form a conducted circuit, from which the driver IC can input a common voltage signal into the plane.

Since the common voltage signal is directly transmitted to the CF-ITO from the driver IC through the COF, there is no need to dispose a common voltage signal line on the TFT array substrate. Since there is no need to dispose a common voltage signal line on the TFT array substrate, it is no longer necessary to conduct signals to the CF substrate by gold ball (Au balls). Therefore, it can reduce gold ball dots process, prevent gold ball dots to shift, spinning, and other undesirable phenomena, and save costs of gold ball materials. Compared to current designs of display panels, the present disclosure effectively narrows an external space of display panels and is very favorable for narrowing frames of VA mode and TN mode display panels.

As shown in FIG. 8, since there is no longer a need to conduct signals to the CF substrate via gold ball (Au balls), there is no limit to the distance that originally the gold ball exceeds the sealing bezel adhesive layer. That is, the distance d2 in FIG. 5 is unnecessary in this embodiment, so that the external space of the panel can be effectively narrowed down. Since there are no conductive materials in the sealing bezel adhesive layer, the sealing bezel adhesive layer covering peripheral circuits of a display area (AA area) of the liquid crystal display panel does not cause short circuit between the two substrates, and a distance from the sealing bezel adhesive layer to the AA area can be further reduced. In the embodiment, the distance d3' from the sealing bezel adhesive layer 64 to the corresponding AA area 81 is less than the distance d3 (as shown in FIG. 5) from the sealing bezel adhesive layer 31 to the corresponding AA area 51 in current technology. That is, the liquid crystal display panel of the present disclosure can realize that the CF substrate-side common voltage signal is transmitted to the CF substrate, material costs of gold ball are reduced, It is very favorable for narrowing frames of VA mode and TN mode display panels, product yield of liquid crystal display panels is effectively improved, production efficiency is improved, and product competitiveness is improved.

Figure 9:
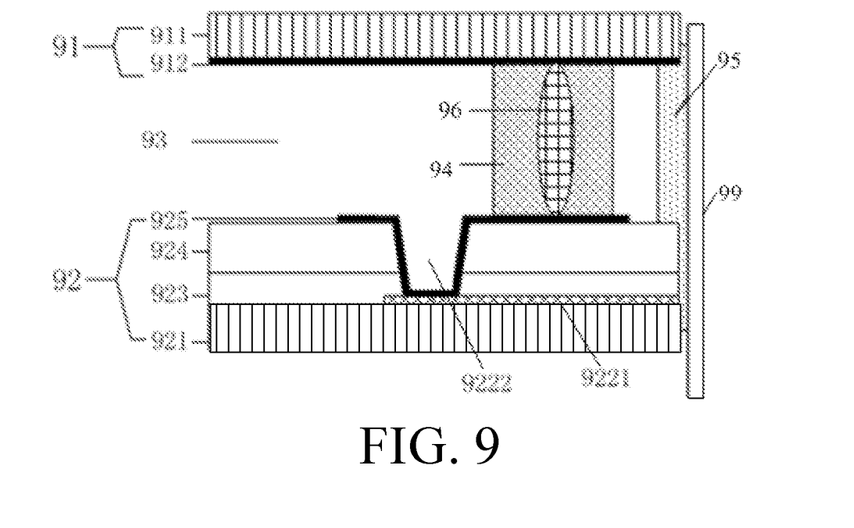
FIG. 9 is a schematic structural diagram of two conducted substrates in a liquid crystal display panel according embodiment 2 of the present disclosure.
Figure 10:
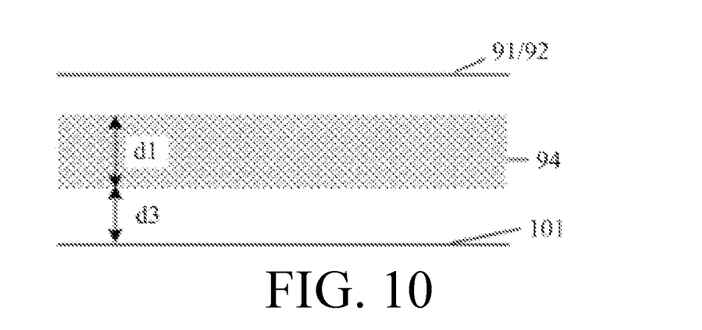
FIG. 10 is a schematic planar diagram of an external setting of the liquid crystal display panel in FIG. 9.

Referring to FIG. 9 and FIG. 10, FIG. 9 is a schematic structural diagram of two conducted substrates in a liquid crystal display panel according embodiment 2 of the present disclosure. FIG. 10 is a schematic planar diagram of an external setting of the liquid crystal display panel in FIG. 9. The difference from the embodiment as shown in FIG. 7 is that, in the embodiment, the common voltage signal line on the COF is electrically connected to the CF substrate-side transparent conductive layer (CF-ITO), and meanwhile is connected to the TFT array substrate-side common voltage signal line, so that the driver IC can input common voltage signals into the plane through the CF-ITO and the TFT array substrate-side common voltage signal line at the same time.

Specifically, a CF substrate 91 includes a first base substrate 911 and a first transparent conductive layer (ITO) 912 disposed on the first base substrate 911. The first transparent conductive layer 912 includes a first common electrode (CF-COM). A TFT array substrate 92 comprises: a second base substrate 921, a first metal layer, a gate insulating layer 923, a passivation layer 924, and a second transparent conductive layer 925 disposed on the second base substrate 921; wherein the first metal layer includes a first common voltage signal line 9221, and the second transparent conductive layer 925 and the first common voltage signal line 9221 are connected by a through-hole. The liquid crystal display panel comprises a side bond pad 95 disposed on sides of the CF substrate 91 and the TFT array substrate 92 and a side of the sealing bezel adhesive layer 94 away from the liquid crystal layer 93; wherein the side bond pad 95 is in contact with the first transparent conductive layer 912. A chip on film 99 is bonded to one side of the liquid crystal display panel provided with the side bond pad 95.

Specifically, in a non-display area of the liquid crystal display panel, a second conductive material 96 is disposed between the CF substrate 91 and the TFT array substrate 92, and the second conductive material 96 is in contact with the first transparent conductive layer 912 and the second transparent conductive layer 925. The first transparent conductive layer 912 is electrically connected to a second common voltage signal line (not shown in the figure) on the chip on film 99 through the side bond pad 95, and meanwhile is electrically connected to the second common voltage signal line through the second conductive material 96, the second transparent conductive layer 925, and the first common voltage signal line 9221. The first common electrode may receive a common voltage signal through a conducted circuit formed by the first transparent conductive layer 912, the side bond pad 95, and the second common voltage signal line, and may also receive the common voltage signal through a conducted circuit formed by the first transparent conductive layer 912, the second conductive material 96, the second transparent conductive layer 925, the first common voltage signal line 9221, and the second common voltage signal line.

Preferably, the second conductive material 96 is added to a sealing material for preparing the sealing bezel adhesive layer 94. The sealing bezel adhesive layer 94 containing the second conductive material 96 can be prepared by a single coating process, which is a relatively simple process.

Preferably, the second conductive material is gold ball. That is, the embodiment uses a way of Au in sealant by adding gold ball materials to the sealing material. In process of one drop filling (ODF), it only needs single coating process for the sealant without additional dotting gold ball on a transfer pad, which is relatively simple.

As shown in FIG. 10, since it is not necessary for a separate process to dot gold ball, there is no limit to the distance that originally the gold ball exceed the sealing bezel adhesive layer. That is, the distance d2 in FIG. 5 is unnecessary in this embodiment, so that the external space of the panel can be effectively narrowed down. However, because the sealing bezel adhesive layer 94 is provided with conductive materials, there is a first distance d3 between the sealing bezel adhesive layer 94 and the display area 101 for preventing signals transmitted in the two substrates to short circuit caused by the sealing bezel adhesive layer 94 covering peripheral circuits of the display area (AA area) 101 of the liquid crystal display panel. The liquid crystal display panel of the present disclosure can achieve that a CF substrate-side common voltage signal is transmitted to the CF substrate, processes relating to gold ball are reduced, an external space of a panel is effectively narrowed, product yield of liquid crystal display panels is effectively improved, production efficiency is improved, and product competitiveness is improved by improving an external structure of display panels.

Based on the same concept, the present disclosure also provides a manufacturing method of a liquid crystal display panel. Specifically, the method comprises following steps: (1) printing a first conductive material on sides of a first substrate and a second substrate and one side of a sealing bezel adhesive layer away from a liquid crystal layer, and preparing a side bond pad in contact with a first transparent conductive layer of the first substrate, wherein the first transparent conductive layer includes a first common electrode; and (2) attaching a chip on film to a side surface of the liquid crystal display panel provided with the side bond pad, and electrically connecting the first transparent conductive layer to a second common voltage signal line on the chip on film through the side bond pad that makes the first common electrode receive a common voltage signal transmitted from the chip on film. The prepared liquid crystal display panel can be referred to FIG. 7, the liquid crystal display panel prepared by the manufacturing method of the present disclosure can realize that the CF substrate-side common voltage signal is transmitted to the CF substrate, material costs of gold ball are reduced, It is very favorable for narrowing frames of VA mode and TN mode display panels, product yield of liquid crystal display panels is effectively improved, production efficiency is improved, and product competitiveness is improved.

In an embodiment of the present disclosure, the second substrate in the step (1) is prepared by following steps: providing a second base substrate; preparing a first metal layer on the second base substrate and patterning the first metal layer to form a first common voltage signal line; and preparing a gate insulating layer, a passivation layer, and a second transparent conductive layer on the first metal layer in sequence, wherein the second transparent conductive layer and the first common voltage signal line are connected by a through-hole. Correspondingly, the step (1) comprises: in a non-display area of the liquid crystal display panel, a second conductive material is disposed between the first substrate and the second substrate, and the second conductive material is in contact with the first transparent conductive layer and the second transparent conductive layer. Through the above processes, the step (2) can comprises: electrically connecting the first transparent conductive layer to the second common voltage signal line through the first conductive material, the second transparent conductive layer, and the second common voltage signal line that makes the first common electrode receive the common voltage signal. That is, the first common electrode may receive the common voltage signal through a conducted circuit formed by the first transparent conductive layer, the side bond pad, and the second common voltage signal line, and may also receive the common voltage signal through a conducted circuit formed by the first transparent conductive layer, the first conductive material, the second transparent conductive layer, the second common voltage signal line, and the second common voltage signal line.

Preferably, the second conductive material can be added to a sealing material and preparing the sealing bezel adhesive layer containing the second conductive material by a single coating process. The prepared liquid crystal display panel can be referred to FIG. 9, the liquid crystal display panel prepared by the manufacturing method of the present disclosure can realize that the CF substrate-side common voltage signal is transmitted to the CF substrate, processes relating to gold ball are reduced, an external space of a panel is effectively narrowed, product yield of liquid crystal display panels is effectively improved, production efficiency is improved, and product competitiveness is improved by improving an external structure of display panels.

INDUSTRIAL APPLICABILITY

The subject matter of the present disclosure can be manufactured and used in industries, thus having industrial applicability.

What is claimed is:

1. A liquid crystal display panel, comprising a first substrate, a second substrate disposed opposite to the first substrate, and a liquid crystal layer disposed between the first substrate and the second substrate, wherein a non-display area of the liquid crystal display panel is provided with a sealing bezel adhesive layer to seal the liquid crystal layer; wherein
  the first substrate comprises a first base substrate and a first transparent conductive layer including a first common electrode;
  the second substrate comprises: a second base substrate, a first metal layer, a gate insulating layer, a passivation layer, and a second transparent conductive layer disposed on the second base substrate; wherein the first metal layer includes a first common voltage signal line, the second transparent conductive layer and the first common voltage signal line are connected by a through-hole;
  the liquid crystal display panel comprises a side bond pad disposed on sides of the first substrate and the second substrate and a side of the sealing bezel adhesive layer away from the liquid crystal layer; wherein the side bond pad is in contact with the first transparent conductive layer, and is made by printing a first conductive material on the sides of the first substrate and the second substrate and the side of the sealing bezel adhesive layer away from the liquid crystal layer; wherein in the non-display area, a second conductive material is disposed between the first substrate and the second substrate, and the second conductive material is in contact with the first transparent conductive layer and the second transparent conductive layer; and
  a side surface of the liquid crystal display panel provided with the side bond pad is bonded with a chip on film, wherein the first transparent conductive layer is electrically connected to a second common voltage signal line on the chip on film through the side bond pad that makes the first common electrode receive a common voltage signal transmitted from the chip on film, and is electrically connected to the second common voltage signal line through the second conductive material, the second transparent conductive layer, and the first common voltage signal line that makes the first common electrode receive the common voltage signal.

2. The liquid crystal display panel according to claim 1, wherein the first conductive material is silver.

3. The liquid crystal display panel according to claim 1, wherein the second conductive material is added to a sealing material for preparing the sealing bezel adhesive layer.

4. The liquid crystal display panel according to claim 1, wherein the second conductive material is gold ball.

5. The liquid crystal display panel according to claim 1, wherein the sealing bezel adhesive layer containing the second conductive material is prepared by a single coating process.

6. The liquid crystal display panel according to claim 1, wherein there is a first distance between the sealing bezel adhesive layer and a display area of the liquid crystal display panel.

7. A liquid crystal display panel, comprising a first substrate, a second substrate disposed opposite to the first substrate, and a liquid crystal layer disposed between the first substrate and the second substrate, wherein a non-display area of the liquid crystal display panel is provided with a sealing bezel adhesive layer to seal the liquid crystal layer; wherein
  the first substrate comprises a first base substrate and a first transparent conductive layer including a first common electrode;
  the liquid crystal display panel comprises a side bond pad disposed on sides of the first substrate and the second substrate and a side of the sealing bezel adhesive layer away from the liquid crystal layer; wherein the side bond pad is in contact with the first transparent conductive layer; and
  a side surface of the liquid crystal display panel provided with the side bond pad is bonded with a chip on film, wherein the first transparent conductive layer is electrically connected to a second common voltage signal line on the chip on film through the side bond pad that makes the first common electrode receive a common voltage signal transmitted from the chip on film.

8. The liquid crystal display panel according to claim 7, wherein the side bond pad is made by printing a first conductive material on the sides of the first substrate and the second substrate and the side of the sealing bezel adhesive layer away from the liquid crystal layer.

9. The liquid crystal display panel according to claim 8, wherein the first conductive material is silver.

10. The liquid crystal display panel according to claim 7, wherein the second substrate comprises: a second base substrate, a first metal layer, a gate insulating layer, a passivation layer, and a second transparent conductive layer disposed on the second base substrate; wherein the first metal layer includes a first common voltage signal line, the second transparent conductive layer and the first common voltage signal line are connected by a through-hole; in the non-display area, a second conductive material is disposed between the first substrate and the second substrate, and the second conductive material is in contact with the first transparent conductive layer and the second transparent conductive layer;
  the first transparent conductive layer is electrically connected to the second common voltage signal line through the second conductive material, the second transparent conductive layer, and the first common voltage signal line that makes the first common electrode receive the common voltage signal.

11. The liquid crystal display panel according to claim 10, wherein the second conductive material is added to a sealing material for preparing the sealing bezel adhesive layer.

12. The liquid crystal display panel according to claim 10, wherein the second conductive material is gold ball.

13. The liquid crystal display panel according to claim 10, wherein the sealing bezel adhesive layer containing the second conductive material is prepared by a single coating process.

14. The liquid crystal display panel according to claim 7, wherein there is a first distance between the sealing bezel adhesive layer and a display area of the liquid crystal display panel.

15. A manufacturing method of a liquid crystal display panel, comprising following steps:
  (1) printing a first conductive material on sides of a first substrate and a second substrate and one side of a sealing bezel adhesive layer away from a liquid crystal layer, and preparing a side bond pad in contact with a first transparent conductive layer of the first substrate, wherein the first transparent conductive layer includes a first common electrode; and
  (2) attaching a chip on film to a side surface of the liquid crystal display panel provided with the side bond pad, and electrically connecting the first transparent conductive layer to a second common voltage signal line on the chip on film through the side bond pad that makes the first common electrode receive a common voltage signal transmitted from the chip on film.

16. The manufacturing method according to claim 15, wherein the first conductive material is silver.

17. The manufacturing method according to claim 15, wherein the second substrate in the step (1) is prepared by following steps:
  providing a second base substrate;
  preparing a first metal layer on the second base substrate and patterning the first metal layer to form a first common voltage signal line; and
  preparing a gate insulating layer, a passivation layer, and a second transparent conductive layer on the first metal layer in sequence, wherein the second transparent conductive layer and the first common voltage signal line are connected by a through-hole;
  the step (1) comprises: in a non-display area of the liquid crystal display panel, a second conductive material is disposed between the first substrate and the second substrate, and the second conductive material is in contact with the first transparent conductive layer and the second transparent conductive layer; and
  the step (2) comprises: electrically connecting the first transparent conductive layer to the second common voltage signal line through the second conductive material, the second transparent conductive layer, and the first common voltage signal line that makes the first common electrode receive the common voltage signal.

18. The manufacturing method according to claim 15, wherein the sealing bezel adhesive layer in the step (1) is prepared by following steps:
  adding the second conductive material to a sealing material and preparing the sealing bezel adhesive layer containing the second conductive material by a single coating process.

19. The manufacturing method according to claim 18, wherein the second conductive material is gold ball.

20. The manufacturing method according to claim 15, wherein there is a first distance between the sealing bezel adhesive layer and a display area of the liquid crystal display panel.

* * * * *